(12) United States Patent
Ziegler

(10) Patent No.: US 11,711,639 B1
(45) Date of Patent: Jul. 25, 2023

(54) SYSTEM AND METHOD FOR TRACKING AND MONITORING THE COUPLING AND UNCOUPLING OF A FASTENER

(71) Applicant: TelemeTrak, Inc., Oakland, CA (US)

(72) Inventor: Frederick Steinway Ziegler, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 33 days.

(21) Appl. No.: 17/467,234

(22) Filed: Sep. 5, 2021

Related U.S. Application Data

(60) Provisional application No. 63/075,295, filed on Sep. 7, 2020.

(51) Int. Cl.
*H04Q 9/00* (2006.01)
(52) U.S. Cl.
CPC ........... *H04Q 9/00* (2013.01); *H04Q 2209/40* (2013.01); *H04Q 2209/88* (2013.01)
(58) Field of Classification Search
None
See application file for complete search history.

(56) References Cited

U.S. PATENT DOCUMENTS

| | | | | |
|---|---|---|---|---|
| 7,400,247 B2 * | 7/2008 | Hopman | ............... | G09F 3/0376 340/545.2 |
| 2010/0326146 A1 * | 12/2010 | Powers | .............. | G07C 9/00174 70/159 |
| 2011/0273852 A1 * | 11/2011 | Debrody | ............... | G09F 3/0317 361/747 |
| 2017/0103683 A1 * | 4/2017 | Yazdi | .................... | G09F 3/0329 |

FOREIGN PATENT DOCUMENTS

JP          2020169841 A    * 10/2020

* cited by examiner

*Primary Examiner* — Curtis A Kuntz
*Assistant Examiner* — Jerold B Murphy
(74) *Attorney, Agent, or Firm* — The Law Office of Raul D. Martinez, PC

(57) ABSTRACT

Embodiments of the present technology may include a system for tracking and monitoring, including a fastener, a triggering mechanism coupled to the fastener for reacting to physical movement of the fastener resulting from tampering, destruction, or uncoupling; a generator; a tracker coupled to the fastener, wherein the tracker determines a triggered event, and wherein the tracker switches to a low power mode based on an event.

10 Claims, 3 Drawing Sheets

SYSTEM AND METHOD FOR TRACKING AND MONITORING THE COUPLING AND UNCOUPLING OF A FASTENER

CLAIM OF PRIORITY

The present application claims priority to U.S. Patent Application No. 63/075,295, entitled "SYSTEM AND METHOD FOR TRACKING AND MONITORING THE UNCOUPLING AND UNCOUPLING OF A FASTENER" and filed Sep. 7, 2020, which is assigned to the assignee hereof and hereby expressly incorporated by reference in its entirety.

FIELD

The disclosure generally relates to a system and monitoring.

SUMMARY

Systems and methods are disclosed herein for tracking and monitoring items, cargoes, or locations. When used for the tracking and monitoring of cargoes, the systems and methods may detect whether a tracker is on water when in transit or at port. Cargoes shipped by sea require a long transit time measured in weeks or months. Cargo conditions at sea tend to remain stable since cargoes are enclosed, isolated and kept relatively stationary. Thus, real-time or frequent monitoring and tracking of cargoes during these long sea transits would not yield informative or desirable data for cargo owners. Real-time or frequent monitoring is more desirable when cargoes are on land and in transit inland. However, real-time or frequent monitoring consumes battery power more quickly, reducing the battery lifespan of the tracker.

A system for tracking is further optimized and improved by replacing the battery with a generator capable of harvesting kinetic energy intrinsic to the motion of items while in transit. The generator may be placed in a suitable location that best captures the kinetic energy of a body in motion or is subject to motion while in transit. Such motions while in transit may include rotational motion due to rotating wheels or from a turbine, vibration and oscillations due to rocking and swaying.

Therefore, the systems described herein are configured to detect the tracker being on water and thus indicative of being in transit at sea or at port. Upon detecting this event, the tracker may go into a low power mode to conserve power consumption from either a battery, a generator, or a battery powered by a generator. The tracker may then revert to normal power mode when it no longer detects being on water. Normal power mode may include real-time or frequent monitoring of telemetry data and/or triggering events.

Embodiments of the present technology may include a system for tracking and monitoring, including a fastener. Embodiments may also include a triggering mechanism coupled to the fastener for reacting to physical movement of the fastener resulting from tampering, destruction, or uncoupling. Embodiments may also include a tracker coupled to the fastener. In some embodiments, the tracker determines and communicates telemetry data and one or more events.

In some embodiments, the tracker may also include a pressure sensor and an accelerometer. In some embodiments, the tracker may also include a computational device coupled to a wireless modem that enables the computational device to communicate wirelessly. In some embodiments, the computational device determines the one or more events. In some embodiments, the one or more events may include determining the tracker being at sea, the triggering mechanism being triggered due to tampering, destruction, or uncoupling of the fastener, and the tracker being at low battery.

In some embodiments, the computational device determines that the tracker is at sea based on a matching of a set of accelerometer data with a motion pattern indicative of waves rocking the tracker when at sea. In some embodiments, the motion pattern may include a set of motion data that shows oscillation of axes in meters/seconds and that do not occur in transit on land. In some embodiments, the computational device sets the tracker to a low power mode when detecting the tracker is at sea or at low battery. In some embodiments, the low power mode reduces energy consumption by the tracker.

Embodiments of the present technology may also include a system for tracking, including a fastener. Embodiments may also include a transmitting device coupled to the fastener. In some embodiments, the transmitting device transmits a wireless signal. Embodiments may also include a triggering mechanism coupled to the fastener. In some embodiments, the triggering mechanism disrupts the wireless signal transmitted by the transmitting device upon detecting and reacting to physical movement of the fastener as a result of tampering, destruction, or uncoupling. Embodiments may also include a tracker communicably coupled to the transmitting device. In some embodiments, the tracker determines and communicates telemetry data and one or more events.

In some embodiments, the transmitting device is a Bluetooth beacon transmitting an identifier to the tracker. In some embodiments, the tracker may also include a pressure sensor and an accelerometer. In some embodiments, the tracker may also include a computational device coupled to a wireless modem that enables the computational device to communicate wirelessly. In some embodiments, the computational device determines the one or more events.

In some embodiments, the computational device determines that the fastener has been subjected to tampering, destruction, or uncoupling upon the loss of the wireless signal due to the triggering mechanism being triggered. In some embodiments, the one or more events may include determining the tracker being at sea, the triggering mechanism being triggered due to tampering, destruction, or uncoupling of the fastener, the tracker being at low battery, an opening of barriers, and a locking of barriers.

In some embodiments, the locking of barriers may also include the fastener coupling with the transmitting device. In some embodiments, the transmitter begins transmitting to the tracker. In some embodiments, the opening of barriers terminates transmission to the tracker. In some embodiments, the computational device determines that the tracker is at sea based on a matching of a set of accelerometer data with a motion pattern indicative of waves rocking the tracker when at sea. In some embodiments, the computational device sets the tracker to a low power mode when determining the tracker is at sea or at low battery. In some embodiments, the low power mode reduces energy consumption by the tracker.

Embodiments of the present technology may also include a method for detecting coupling and uncoupling of a transmitting device with a fastener, including coupling the transmitting device to the fastener. Embodiments may also include detecting tampering or destruction of the transmitting device. Embodiments may also include detecting uncoupling of the transmitting device from the fastener. Embodiments may also include transmitting periodically wireless signal by the transmitting device when the transmitting device is coupled to the fastener. Embodiments may also include ceasing transmitting the wireless signal when the transmitting device is tampered with, destroyed, or uncoupled from the fastener, whereby detecting the presence or absence of the periodic wireless signal may include the method for detecting the coupling or uncoupling, respectively.

In some embodiments, coupling the transmitting device to the fastener and detecting the uncoupling of the transmitting device from the fastener may also include reporting a coupling or an uncoupling event, and a location to a remote server. In some embodiments, a tracker monitors the periodic wireless signal. In some embodiments, the tracker detects the coupling and uncoupling events. In some embodiments, the tracker senses its location when the coupling and uncoupling events occur. In some embodiments, the tracker reports the coupling and uncoupling events along with the location to the remote server. Embodiments may also include whereby the tracker reports the coupling and uncoupling events and location to the remote server.

In some embodiments, the tracker reduces electrical power consumption of the tracker at while at sea. In some embodiments, the tracker determines from its location that it is at sea. In some embodiments, the tracker reduces power consumption while at sea by both monitoring the periodic wireless signal less frequently and not attempting to communicate with the remote server while at sea. Embodiments may also include whereby the tracker reduces the electrical power consumption while at sea.

DETAILED DESCRIPTION

Terminology for Fasteners

Figure 1:
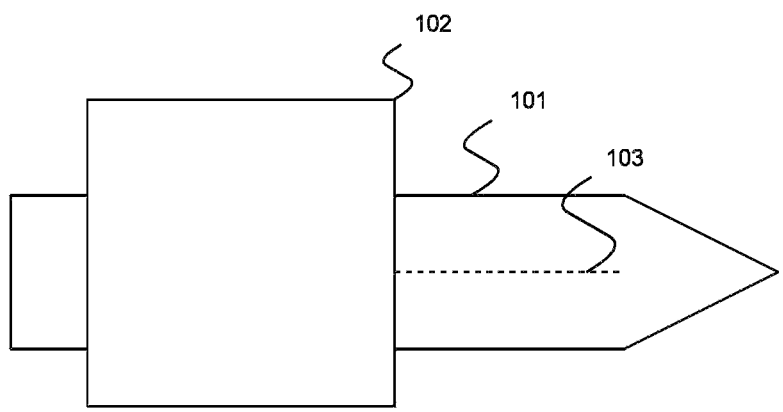
FIG. 1 is an example of a system for tracking and monitoring coupling and uncoupling with a fastener.

In one embodiment, a fastener may be a bolt, latch, nut, pin, pipe, rivet, rod, screw, or spike.

In one embodiment, a triggering mechanism may be a wire or cord attached to some device for detecting or reacting to physical movement.

Terminology for Transmitting and Sensors

In one embodiment, a transmitting device may be a Bluetooth beacon using Bluetooth low energy proximity sensing to transmit a universally unique identifier.

In one embodiment, a low power mode may be achieved by reducing the tracker's operation period, including the monitoring, tracking, logging, and communicating.

In one embodiment, sensors may comprise pressure, motion, thermal, ambient light, temperature, humidity, audio, infrared, and visual.

In one embodiment, a transmitting device may include wireless modem and protocol suitable for cellular, WiFi, radio, infrared, satellite, Zigbee, and microwave (WiMax) signaling.

Terminology for Energy and Physics

In one embodiment, kinetic mechanical energy comprises the kinetic energy of a mechanical system.

In one embodiment, kinetic mechanical energy comprises the linear and rotational motion of a mechanical system.

In one embodiment, kinetic mechanical energy comprises the energy of a mechanical system that is independent of the potential energy of said mechanical system.

In one embodiment, rotational mechanical energy comprises the rotational component of a mechanical system's kinetic mechanical energy.

In one embodiment, mechanical power comprises kinetic mechanical energy expended per unit.

Terminology for Power Generation

In one embodiment, a kinetic motion power generator comprises a means for converting kinetic energy into electrical power.

In one embodiment, a kinetic motion power generator comprises a means for converting kinetic energy from the motion of a towed transport platform into electrical power.

In one embodiment, a dynamo comprises a means for converting kinetic mechanical energy into electrical power.

In one embodiment, a kinetic motion power generator comprises a dynamo.

In one embodiment, an electric generator comprises a means for converting rotational mechanical energy into electrical power.

In one embodiment, an electric generator comprises a means for converting rotation into electrical power.

In one embodiment, a dynamo comprises an electric generator.

In one embodiment, a turbine comprises a means for converting the kinetic energy of a moving fluid into rotational mechanical energy.

In one embodiment, a turbine comprises a means for converting the kinetic energy of airflow resulting from the motion of a towed transport platform into rotational mechanical energy.

In one embodiment, a turbine comprises a means for converting airflow into rotation.

In one embodiment, a turbine electric generator comprises a turbine physically coupled to an electric generator wherein the rotational mechanical energy of said turbine is converted into electrical power by means of said electric generator.

In one embodiment, a dynamo comprises a turbine electric generator.

In one embodiment, a kinetic motion power generator comprises a turbine electric generator.

In one embodiment, a gearing comprises a means for transmitting rotational mechanical energy from one mechanical system to another mechanical system.

In one embodiment, a gearing comprises a means for transmitting the rotation of one mechanical system to another mechanical system.

In one embodiment, a geared electric generator comprises an electric generator physically coupled to a gearing that is physically coupled to a rotational mechanical energy source wherein the energy of said rotational mechanical energy source is converted into electrical power by means of said electric generator.

In one embodiment, a rotational mechanical energy source comprises a towed transport platform wheel that rotates when said towed transport platform is in motion.

In one embodiment, a rotating wheel component comprises a wheel, tire, axle, or other component of a wheel that rotates when said wheel rotates.

In one embodiment, a rotating wheel component comprises a rotating wheel component of a towed transport platform wheel.

In one embodiment, a geared electric generator comprises an electric generator physically coupled to a gearing that is physically coupled to a rotating wheel component wherein rotational mechanical energy of said rotating wheel component is converted into electrical power by means of said electric generator.

In one embodiment, a dynamo comprises a geared electric generator.

In one embodiment, a kinetic motion power generator comprises a geared electric generator.

In one embodiment, a change in magnetic flux induces electrical power in an inductor.

In one embodiment, a magnet passing by an inductor induces electrical power in said inductor.

In one embodiment, an energy storage device comprises a means for converting power into potential energy and a means for converting said potential energy back into power.

In one embodiment, an electrical energy storage device comprises a means for converting electrical power into potential energy.

In one embodiment, a magnet comprises a body having the property of attracting iron and producing a magnetic field external to itself.

In one embodiment, a magnet comprises a body producing a magnetic flux external to itself.

In one embodiment, a magnet comprises a means for producing magnetic flux.

In one embodiment, an inductor comprises an electrically conductive material arranged in one or more coils such that a change in magnetic flux along the axis of said coil induces an electric current in said coil.

In one embodiment, an inductor comprises a means for converting changing magnetic flux into electrical power.

In one embodiment, an electrical energy storage device comprises a means for converting electrical power into potential energy and a means for converting said potential energy back into electrical power.

In one embodiment, an electrical energy storage device comprises a battery.

In one embodiment, an electrical energy storage device comprises a capacitor.

In one embodiment, an energy storage device comprises an electrical energy storage device.

In one embodiment, a mechanical energy storage device comprises a means for converting mechanical power into potential energy.

In one embodiment, a mechanical energy storage device comprises a means for converting potential energy into mechanical power.

In one embodiment, a mechanical energy storage device comprises a means for converting mechanical power into potential energy and a means for converting said potential energy into mechanical power.

In one embodiment, a mechanical energy storage device comprises a means for converting rotational mechanical energy into potential energy.

In one embodiment, a mechanical energy storage device comprises a means for converting rotation into potential energy.

In one embodiment, a mechanical energy storage device comprises a spring system comprising one or more springs, a means for converting mechanical power into potential energy stored in said springs and a means for releasing said potential energy back into mechanical power.

In one embodiment, a mechanical energy storage device comprises a flywheel system comprising one or more flywheels, a means for converting mechanical power into rotational mechanical energy stored in said flywheels and a means for releasing said rotational mechanical energy back into mechanical power.

In one embodiment, an energy storage device comprises a mechanical energy storage device.

Terminology for Events

In one embodiment, an event comprises a low power mode.

In one embodiment, an event comprises a location of the tracker being at sea.

In one embodiment, an event comprises how much longer the tracker will be at sea based on the present location of the tracker being at sea, and a second location to the destination or the nearest port.

FIG. 1 illustrates an example of a system that includes a fastener 101, a tracker 102, and a triggering mechanism 103. A fastener 101 is used to secure an item, cargo, or a location. A fastener 101 may secure cargoes and items by acting as a bolt to fasten a cargo door or latch. A triggering mechanism 103 may be used with the fastener 101 whereby removing, tampering, or destroying the fastener 101 would result in triggering the triggering mechanism 103. A tracker 102 coupled to the fastener 101 may detect the triggering mechanism 103 has been triggered to indicate the removing, tampering, or destruction of the fastener 101.

The triggering mechanism 103 may be a mechanical, electrical or optical trigger. Further, the trigger may be a wire, cord or circuit that completes a circuit or conversely interrupts a close circuit when the trigger is disturbed.

A tracker 102 may be any computational device configured to manipulate electronic signals and execute algorithms. In a specific example, a tracker 102 may be a computational device coupled to a memory storage component and an energy storage device. In a specific example, a tracker 102 may couple to a GPS system, and/or sensors. The sensors may be directed to telemetry sensing and/or environmental conditional sensing such as sensing for pressure, rotation, movement, temperature, audio, particulates, moisture, light, and/or thermal.

Further, the systems described herein may include additional sensors coupled to the tracker. These sensors may be a pressure sensor and an accelerometer. Sensors may be positioned at appropriate locations for sensing, externally or embedded, by using the appropriate fasteners. A bolt may be used to secure sensors and the triggering mechanism to cargo door hinges or latches. A screw may be used to secure sensors to external walls for outside monitoring.

A computational device, coupled to the tracker, may receive data from these sensors to determine different events surrounding the tracker. An event determinable by the computational device may also include the triggering of the triggering mechanism due to a change in an electric current.

In a specific example of a tracker used for tracking shipments and cargoes, the computational device may determine that the tracker is located on a body of water, such as the ocean. The computational device may make this determination based on a set of accelerometer data received from the pressure sensor, such that the set of accelerometer data matches a predetermined profile for motions while on water. This predetermined profile may include a range of accelerometer data comprising of motions on all three axes, individually or in combination, to indicate motion on water due to buoyancy, wave motions, and other motions inherent to being on water at sea.

In a specific example, the tracker may be configured to intelligently learn motions while on water based on logged sensing database of accelerometer, pressure sensor, and location data (which shows when at sea, when in port, and when on land) to teach our system how to tell the difference.

Optionally, a determination of the tracker located on a body of water may include data from the pressure sensor. A pressure reading of about 14.7 pound per square inch may be used to indicate a pressure reading normally at sea level. Thus, a reading of about 14.7 pound per square inch may be used separately or in combination with the set of accelerometer data to determine the tracker being on a body of water or at sea. In a specific example, a pressure reading of about 14.7 pound may be a range of values including this value, an average reading over a period of time, or an adjusted value due to internal conditions.

Optionally, a determination of the tracker's location, whether at sea or otherwise, may be determined from a GPS device. GPS data from the GPS device may be used in coordination with a navigation system to determine the tracker's location.

Upon detecting that the tracker is located on a body of water or at sea, the tracker may revert to a low power mode to conserve power consumption. A low power may include reducing the frequency of monitoring, tracking, logging, and communication by the computational device. Additionally, sensors may operate at a lower spectrum with respect to the range, span, accuracy, precision, and sensitivity of the sensor's measurements. In a specific example, the tracker may determine the duration the tracker will be at sea based on the present location being at sea, and the nearest port or the distance and time to the destination. The tracker may then switch to low power mode during this duration.

In a specific example, the lower power mode may include not attempting to establish a cellular connection when at sea.

In a specific example, the lower power mode may continue establishing a cellular connection with a wireless network onboard the ship or with a remote land-based server via the onboard wireless network. The tracker, when it detects that it has been loaded onto a ship (portside, when it still has cellular communications), may look up which ship is at its current location in an AIS database, and then querying one or more servers to discover if said ship has a wireless network that it can use. Alternatively, the tracker may be programmed by a server ahead of time to know which ship will be carrying it and all of the wireless network details.

Figure 2:
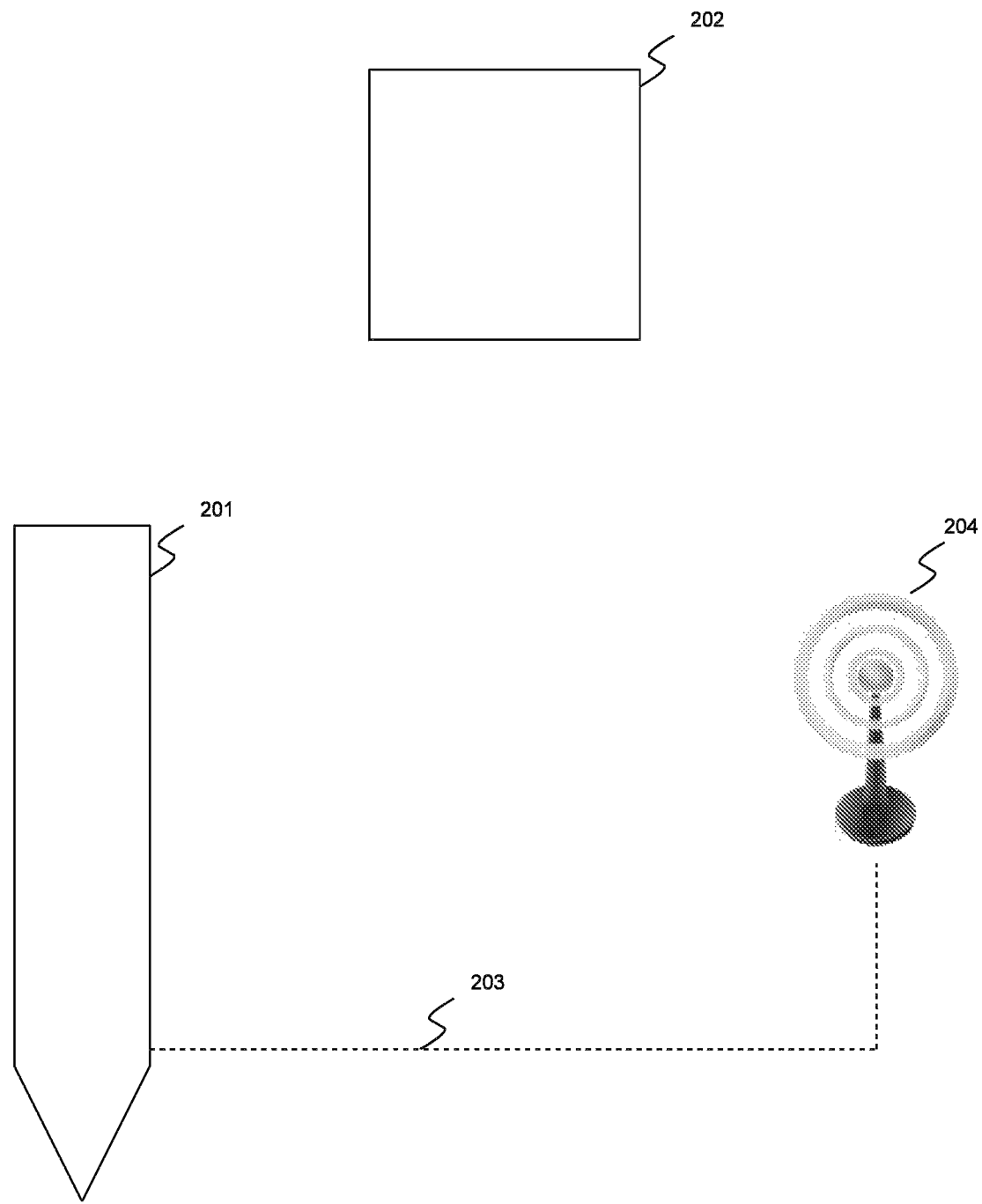
FIG. 2 is an example of a system for tracking and monitoring with a transmitting device and a fastener.

FIG. 2 illustrates an example of a system that includes a fastener 201, a triggering mechanism 203, a transmitting device 204, and a tracker 202. The transmitting device 204 is attached to the fastener 201 and communicates wirelessly with the tracker 202. The transmitting device 204 may be a Bluetooth beacon transmitting a unique identifier to the tracker 202. The triggering mechanism 203 may be configured to either disrupt the transmitting device's 204 signaling or trigger the transmitting device's 204 signaling to the tracker 202. A computational device, coupled to the tracker, may determine that the triggering mechanism 204 has been disturbed upon receiving either events from the Bluetooth beacon. Additionally, the transmitting device 204 may signal a notification message of the disturbance to the tracker 202.

Optionally, a transmitting device may be any wireless modem or protocol including cellular, WiFi, radio, infrared, satellite, Zigbee, and microwave (WiMax). Sensors may be attached to the transmitting device and communicate wirelessly to the tracker.

Figure 3:
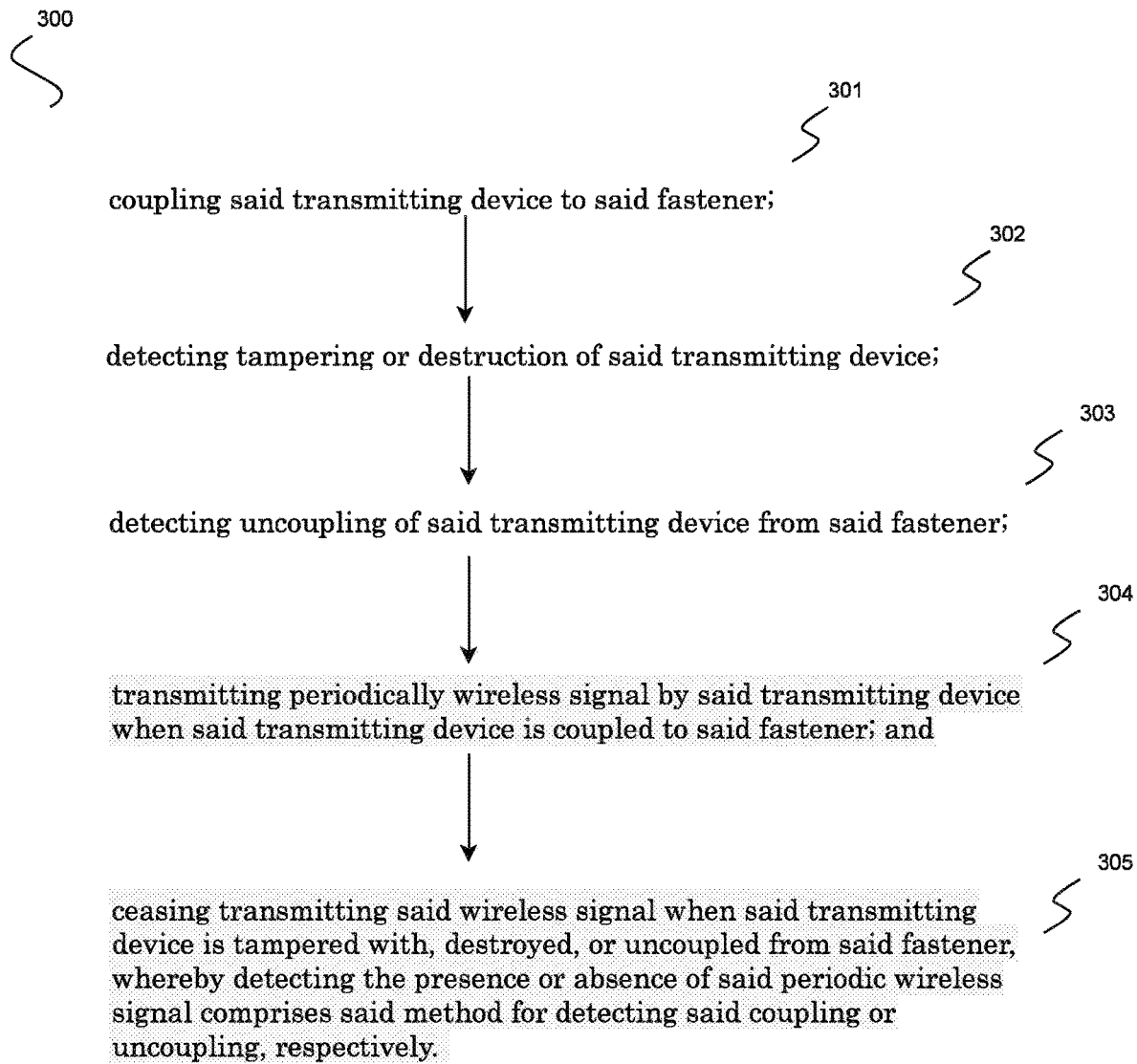
FIG. 3 is a flowchart of an example of a method for tracking and monitoring coupling and uncoupling events.

FIG. 3 illustrates an example method 300 of implementing the systems described herein. A fastener is initially coupled to a transmitting device in step 301. This coupling enables the detecting of tampering or destruction of the transmitting device in step 302, or the uncoupling of the transmitting device from the fastener in step 303. This detecting is accomplished by the transmitting device transmitting periodically wireless signal when the transmitting device is coupled to the fastener in step 304, and whereby the transmitting device ceases transmitting the wireless signal upon being tampered with, destroyed, or uncoupled from the fastener in step 305.

In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3. Similarly, any of the features of any of the methods described herein may be performed in parallel or performed in a different manner/order than that described or shown herein.

The systems described herein may include a fastener, a triggering mechanism, a tracker, and a generator. The generator may be coupled to the tracker and a battery.

In a specific example, the generator further includes a magnet, an inductor, and a rotating component coupled to the electric generator. The magnet is coupled to the rotating component and the inductor is coupled to a surface in proximity to the magnet. The surface may be an enclosure surrounding the rotating component. As such, the rotation of the rotating component causes the magnet to pass by the inductor, which induces electrical power in the inductor. Electrical power produced by the inductor or generator generally may then be used to power the tracker.

In a specific example, the rotating component may be a turbine, wherein the turbine's axis of rotation is oriented substantially perpendicular to the direction of motion of airflow. The airflow causes the rotation of the turbine. In another specific example, the rotating component may be a rotating wheel component. The rotating wheel component may further include an axle. Rotating of the rotating wheel component would cause the electric generator to generate electrical power. In a further specific example, the rotating component may be physically coupled to a gearing such that the gearing transmits rotation from the rotating component to the electric generator. The gearing may specifically be coupled to an axle of a rotating component such as a rotating wheel component.

In some embodiments, the generator may harvest kinetic energy from vibration and oscillation. In a specific example, the generator may be a piezoelectric generator. In another specific example, the generator may be a dynamo.

Another embodiment may include a fastener, a triggering mechanism, a tracker, a generator, and an energy storage device coupled to the generator. The energy storage device converts and stores energy into potential energy. In a specific example, the electrical energy storage device may be an electrical energy storage device coupled to the inductor. In another specific example, the energy storage device may be a mechanical energy storage device coupled to the rotating component or the gearing. The mechanical energy storage device converts the rotation from the rotating component or as transmitted by the gearing into potential energy. The energy storage device may then power the operation of the tracker.

It is understood that elements of the subject matter provided herein may have alternative forms without departing from the scope of the foregoing and may be provided in any number of configurations. In a specific example, a tracker may be coupled to a plurality of fasteners, transmitting device, sensors, or any combination thereof. Conversely, a plurality of trackers may be coupled to a plurality of devices.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A system for tracking and monitoring, comprising:
   a fastener;
   a triggering mechanism coupled to said fastener for reacting to physical movement of said fastener resulting from tampering, destruction, or uncoupling; and
   a tracker coupled to said fastener, wherein said tracker determines and communicates telemetry data and one or more events, wherein said tracker further comprises:
      at least one of the following: a pressure sensor, and an accelerometer, and
      a computational device coupled to a wireless modem that enables said computational device to communicate wirelessly, and wherein said computational device determines said one or more events, wherein said one or more events comprise determining said tracker being at sea, said triggering mechanism being triggered due to tampering, destruction, or uncoupling of said fastener, and said tracker being at low battery, wherein said computational device determines that said tracker is at sea based on a matching of a set of accelerometer data with a motion pattern indicative of waves rocking said tracker when at sea.

2. The system of claim 1, wherein said motion pattern comprises a set of motion data that shows oscillation of axes in meters/seconds and that do not occur in transit on land.

3. The system of claim 1, wherein said computational device sets said tracker to a low power mode when detecting said tracker is at sea or at low battery, and wherein said low power mode reduces energy consumption by said tracker.

4. The system of claim 3, wherein the low power mode comprises a duration equal to a transit time while at sea, wherein said transit time is based on determining a distance to nearest port or destination while at sea.

5. A system for tracking, comprising:
   a fastener;
   a transmitting device coupled to said fastener, wherein said transmitting device transmits a wireless signal;
   a triggering mechanism coupled to said fastener, wherein said triggering mechanism disrupts said wireless signal transmitted by said transmitting device upon reacting to physical movement of said fastener as a result of tampering, destruction, or uncoupling; and
   a tracker communicably coupled to said transmitting device, wherein said tracker determines and communicates telemetry data and one or more events, wherein said tracker further comprises:
      at least one of the following: a pressure sensor, and an accelerometer, and
      a computational device coupled to a wireless modem that enables said computational device to communicate wirelessly, and wherein said computational device determines said one or more events, wherein said one or more events comprise determining said tracker being at sea, said triggering mechanism being triggered due to tampering, destruction, or uncoupling of said fastener, said tracker being at low battery, an opening of barriers, and a locking of barriers, wherein said computational device determines that said tracker is at sea based on a matching of a set of accelerometer data with a motion pattern indicative of waves rocking said tracker when at sea.

6. The system of claim 5, wherein said transmitting device is a Bluetooth beacon transmitting an identifier to said tracker.

7. The system of claim 5, wherein said computational device determines that said fastener has been subjected to tampering, destruction, or uncoupling upon said loss of said wireless signal due to said triggering mechanism being triggered.

8. The system of claim 5, wherein said locking of barriers further comprises said fastener coupling with said transmitting device, wherein said transmitter begins transmitting to said tracker, and wherein said opening of barriers terminates transmission to said tracker.

9. The system of claim 5 wherein said computational device sets said tracker to a low power mode when determining said tracker is at sea or at low battery, and wherein said low power mode reduces energy consumption by said tracker.

10. A method for detecting coupling and uncoupling of a transmitting device with a fastener, comprising:
    coupling said transmitting device to said fastener;
    detecting tampering or destruction of said transmitting device;
    detecting uncoupling of said transmitting device from said fastener;
    transmitting periodically a wireless signal by said transmitting device when said transmitting device is coupled to said fastener;
    ceasing transmitting said wireless signal when said transmitting device is tampered with, destroyed, or uncoupled from said fastener, whereby detecting the presence or absence of said periodic wireless signal comprises said method for detecting said coupling or uncoupling, respectively,
    wherein coupling said transmitting device to said fastener and detecting the uncoupling of said transmitting device from said fastener further comprises reporting a coupling or an uncoupling event, and a location to a remote server, wherein a tracker monitors said periodic wireless signal, wherein said tracker detects said coupling and uncoupling events; wherein said tracker senses its location when said coupling and uncoupling events occur; wherein said tracker reports said coupling and uncoupling events along with said location to said remote server; and whereby said tracker reports said coupling and uncoupling events and location to said remote server,
    wherein the tracker reduces electrical power consumption of said tracker while at sea,
    wherein said tracker determines from its location that it is at sea;
    wherein said tracker reduces power consumption while at sea by both monitoring said periodic wireless signal less frequently and not attempting to communicate with said remote server while at sea; and whereby said tracker reduces said electrical power consumption while at sea.

* * * * *